(12) United States Patent
Kasower

(10) Patent No.: US 9,652,802 B1
(45) Date of Patent: May 16, 2017

(54) INDIRECT MONITORING AND REPORTING OF A USER'S CREDIT DATA

(75) Inventor: Sheldon Kasower, Bell Canyon, CA (US)

(73) Assignee: CONSUMERINFO.COM, INC., Irvine, CA (US)

( * ) Notice: Subject to any disclaimer, the term of this patent is extended or adjusted under 35 U.S.C. 154(b) by 0 days.

(21) Appl. No.: 13/069,896

(22) Filed: Mar. 23, 2011

Related U.S. Application Data

(60) Provisional application No. 61/316,994, filed on Mar. 24, 2010.

(51) Int. Cl.
*G06Q 40/00* (2012.01)

(52) U.S. Cl.
CPC .................... *G06Q 40/00* (2013.01)

(58) Field of Classification Search
CPC ......... G06Q 40/00; G06Q 40/02; G06Q 20/40
USPC .............................. 705/44; 235/380; 379/455
See application file for complete search history.

(56) References Cited

U.S. PATENT DOCUMENTS

| | | |
|---|---|---|
| 5,590,038 A | 12/1996 | Pitroda |
| 5,640,577 A | 6/1997 | Scharmer |
| 5,745,654 A | 4/1998 | Titan |
| 5,754,632 A | 5/1998 | Smith |
| 5,819,226 A | 10/1998 | Gopinathan et al. |
| 5,844,218 A | 12/1998 | Kawan et al. |
| 5,884,289 A | 3/1999 | Anderson et al. |
| 5,903,830 A | 5/1999 | Joao et al. |
| 5,956,693 A | 9/1999 | Geerlings |
| 5,990,038 A | 11/1999 | Suga et al. |
| 5,999,596 A | 12/1999 | Walker et al. |

(Continued)

FOREIGN PATENT DOCUMENTS

| | | |
|---|---|---|
| GB | 2 384 087 A | 7/2003 |
| GB | 2 392 748 A | 3/2004 |

(Continued)

OTHER PUBLICATIONS

Rethinking Regulation of credit rating agencies: An institutional investor perspective. Frank Partnoy. Apr. 2009.*

(Continued)

*Primary Examiner* — Alexander Kalinowski
*Assistant Examiner* — John Preston
(74) *Attorney, Agent, or Firm* — Knobbe Martens Olson & Bear LLP

(57) ABSTRACT

Methods and systems of monitoring and reporting of changes to a user's credit data are provided. One embodiment includes providing a service, hosted by a data server, that allows the user to access the service via a communication terminal. The service may also request enrollment data, including identity verification data, from the user. Further, the service may periodically access and monitor the user's credit data for a change in the user's credit data via a connection between the data server and a credit bureau even if the data server has not received sufficient identity verification data from the user. Additionally, the service may determine whether a change detected in the user's credit data is a significant event. When an event or a significant event in the user's credit data is detected, the service may alert the user of the fact that an event has occurred even if the data server has not received sufficient identity verification data from the user.

24 Claims, 6 Drawing Sheets

(56) References Cited

U.S. PATENT DOCUMENTS

| | | |
|---|---|---|
| 6,029,154 A | 2/2000 | Pettitt |
| 6,038,551 A | 3/2000 | Barlow et al. |
| 6,094,643 A | 7/2000 | Anderson et al. |
| 6,157,707 A | 12/2000 | Baulier et al. |
| 6,254,000 B1 | 7/2001 | Degen et al. |
| 6,311,169 B2 | 10/2001 | Duhon |
| 6,330,546 B1 | 12/2001 | Gopinathan et al. |
| 6,418,436 B1 | 7/2002 | Degen et al. |
| 6,513,018 B1 | 1/2003 | Culhane |
| 6,597,775 B2 | 7/2003 | Lawyer et al. |
| 6,615,193 B1 | 9/2003 | Kingdon et al. |
| 6,658,393 B1 | 12/2003 | Basch et al. |
| 6,714,918 B2 | 3/2004 | Hillmer et al. |
| 6,804,346 B1 | 10/2004 | Mewhinney |
| 6,850,606 B2 | 2/2005 | Lawyer et al. |
| 6,910,624 B1 | 6/2005 | Natsuno |
| 6,985,887 B1 | 1/2006 | Sunstein et al. |
| 7,028,052 B2 | 4/2006 | Chapman et al. |
| 7,133,935 B2 | 11/2006 | Hedy |
| 7,212,995 B2 | 5/2007 | Schulkins |
| 7,234,156 B2 | 6/2007 | French et al. |
| 7,263,506 B2 | 8/2007 | Lee et al. |
| 7,277,875 B2 | 10/2007 | Serrano-Morales et al. |
| 7,314,167 B1 | 1/2008 | Kiliccote |
| 7,343,149 B2 | 3/2008 | Benco |
| 7,356,516 B2 | 4/2008 | Richey et al. |
| 7,428,509 B2 | 9/2008 | Klebanoff |
| 7,433,855 B2 | 10/2008 | Gavan et al. |
| 7,451,113 B1 | 11/2008 | Kasower |
| 7,458,508 B1 | 12/2008 | Shao et al. |
| 7,509,117 B2 | 3/2009 | Yum |
| 7,512,221 B2 | 3/2009 | Toms |
| 7,529,698 B2 | 5/2009 | Joao |
| 7,542,993 B2 | 6/2009 | Satterfield |
| 7,543,739 B2 | 6/2009 | Brown et al. |
| 7,546,271 B1 | 6/2009 | Chmielewski et al. |
| 7,548,886 B2 | 6/2009 | Kirkland et al. |
| 7,575,157 B2 | 8/2009 | Barnhardt et al. |
| 7,581,112 B2 | 8/2009 | Brown et al. |
| 7,584,146 B1 | 9/2009 | Duhon |
| 7,610,216 B1 | 10/2009 | May et al. |
| 7,620,596 B2 | 11/2009 | Knudson et al. |
| 7,623,844 B2 | 11/2009 | Herrmann et al. |
| 7,668,769 B2 | 2/2010 | Baker et al. |
| 7,689,505 B2 | 3/2010 | Kasower |
| 7,690,032 B1 | 3/2010 | Peirce |
| 7,708,190 B2 | 5/2010 | Brandt et al. |
| 7,761,379 B2 | 7/2010 | Zoldi et al. |
| 7,761,384 B2 | 7/2010 | Madhogarhia |
| 7,774,270 B1 | 8/2010 | MacCloskey |
| 7,778,885 B1 | 8/2010 | Semprevivo et al. |
| 7,801,811 B1 | 9/2010 | Merrell et al. |
| 7,802,104 B2 | 9/2010 | Dickinson |
| 7,805,362 B1 | 9/2010 | Merrell et al. |
| 7,827,115 B2 | 11/2010 | Weller et al. |
| 7,853,493 B2 | 12/2010 | DeBie et al. |
| 7,856,494 B2 | 12/2010 | Kulkarni |
| 7,870,078 B2 | 1/2011 | Clark et al. |
| 7,975,299 B1 | 7/2011 | Balducci et al. |
| 7,991,689 B1 | 8/2011 | Brunzell et al. |
| 8,001,042 B1 | 8/2011 | Brunzell et al. |
| 8,037,097 B2 | 10/2011 | Guo et al. |
| 8,060,424 B2 | 11/2011 | Kasower |
| 8,065,233 B2 | 11/2011 | Lee et al. |
| 8,104,679 B2 | 1/2012 | Brown |
| 8,127,986 B1 | 3/2012 | Taylor et al. |
| 8,195,549 B2 | 6/2012 | Kasower |
| 8,214,262 B1 | 7/2012 | Semprevivo et al. |
| 8,234,498 B2 | 7/2012 | Britti et al. |
| 8,355,967 B2 | 1/2013 | Debie et al. |
| 8,364,588 B2 | 1/2013 | Celka et al. |
| 8,515,844 B2 | 8/2013 | Kasower |
| 2001/0011245 A1 | 8/2001 | Duhon |
| 2001/0029482 A1 | 10/2001 | Tealdi et al. |
| 2002/0069122 A1 | 6/2002 | Yun et al. |
| 2002/0077964 A1 | 6/2002 | Brody et al. |
| 2002/0087460 A1 | 7/2002 | Hornung |
| 2002/0099635 A1 | 7/2002 | Guiragosian |
| 2002/0099649 A1 | 7/2002 | Lee et al. |
| 2002/0107957 A1 | 8/2002 | Zargham et al. |
| 2002/0128962 A1 | 9/2002 | Kasower |
| 2002/0161711 A1 | 10/2002 | Sartor et al. |
| 2002/0169747 A1 | 11/2002 | Chapman et al. |
| 2002/0173994 A1 | 11/2002 | Ferguson, III |
| 2002/0188544 A1 | 12/2002 | Wizon et al. |
| 2003/0009418 A1 | 1/2003 | Green et al. |
| 2003/0009426 A1 | 1/2003 | Ruiz-Sanchez |
| 2003/0050882 A1 | 3/2003 | Degen et al. |
| 2003/0061163 A1 | 3/2003 | Durfield |
| 2003/0065563 A1 | 4/2003 | Elliott et al. |
| 2003/0078877 A1 | 4/2003 | Beirne et al. |
| 2003/0097320 A1 | 5/2003 | Gordon |
| 2003/0115133 A1 | 6/2003 | Bian |
| 2003/0158751 A1 | 8/2003 | Suresh et al. |
| 2003/0182214 A1 | 9/2003 | Taylor |
| 2003/0195859 A1 | 10/2003 | Lawrence |
| 2003/0225692 A1 | 12/2003 | Bosch et al. |
| 2004/0030649 A1 | 2/2004 | Nelson et al. |
| 2004/0039686 A1 | 2/2004 | Klebanoff |
| 2004/0054619 A1 | 3/2004 | Watson et al. |
| 2004/0064401 A1 | 4/2004 | Palaghita et al. |
| 2004/0078323 A1 | 4/2004 | Johnston et al. |
| 2004/0103147 A1* | 5/2004 | Flesher et al. ............... 709/204 |
| 2004/0111305 A1 | 6/2004 | Gavan et al. |
| 2004/0117235 A1 | 6/2004 | Shacham |
| 2004/0153330 A1 | 8/2004 | Miller et al. |
| 2004/0167793 A1 | 8/2004 | Masuoka et al. |
| 2004/0177046 A1 | 9/2004 | Ogram |
| 2004/0199462 A1 | 10/2004 | Starrs |
| 2004/0225594 A1 | 11/2004 | Nolan, III et al. |
| 2004/0230448 A1 | 11/2004 | Schaich |
| 2004/0230527 A1 | 11/2004 | Hansen et al. |
| 2004/0230534 A1 | 11/2004 | McGough |
| 2004/0243518 A1 | 12/2004 | Clifton et al. |
| 2005/0021476 A1 | 1/2005 | Candella et al. |
| 2005/0027983 A1 | 2/2005 | Klawon |
| 2005/0058262 A1 | 3/2005 | Timmins et al. |
| 2005/0065874 A1 | 3/2005 | Lefner et al. |
| 2005/0097051 A1 | 5/2005 | Madill et al. |
| 2005/0154664 A1 | 7/2005 | Guy et al. |
| 2005/0154665 A1 | 7/2005 | Kerr |
| 2005/0256809 A1 | 11/2005 | Sadri |
| 2005/0273442 A1 | 12/2005 | Bennett et al. |
| 2005/0278542 A1 | 12/2005 | Pierson et al. |
| 2005/0279827 A1 | 12/2005 | Mascavage et al. |
| 2006/0032909 A1 | 2/2006 | Seegar |
| 2006/0041464 A1 | 2/2006 | Powers et al. |
| 2006/0059110 A1 | 3/2006 | Madhok et al. |
| 2006/0074986 A1 | 4/2006 | Mallalieu et al. |
| 2006/0080230 A1 | 4/2006 | Freiberg |
| 2006/0080263 A1 | 4/2006 | Willis et al. |
| 2006/0129481 A1 | 6/2006 | Bhatt et al. |
| 2006/0131390 A1 | 6/2006 | Kim |
| 2006/0161435 A1 | 7/2006 | Atef et al. |
| 2006/0173776 A1 | 8/2006 | Shalley et al. |
| 2006/0178971 A1 | 8/2006 | Owen et al. |
| 2006/0200396 A1* | 9/2006 | Satterfield et al. ............ 705/35 |
| 2006/0202012 A1 | 9/2006 | Grano et al. |
| 2006/0204051 A1 | 9/2006 | Holland, IV |
| 2006/0229961 A1 | 10/2006 | Lyftogt et al. |
| 2006/0239512 A1 | 10/2006 | Petrillo |
| 2006/0242047 A1 | 10/2006 | Haggerty et al. |
| 2006/0253358 A1 | 11/2006 | Delgrosso et al. |
| 2006/0262929 A1 | 11/2006 | Vatanen et al. |
| 2006/0265243 A1 | 11/2006 | Racho et al. |
| 2006/0271456 A1 | 11/2006 | Romain et al. |
| 2006/0271457 A1 | 11/2006 | Romain et al. |
| 2006/0271472 A1 | 11/2006 | Cagan |
| 2007/0005508 A1 | 1/2007 | Chiang |
| 2007/0016522 A1 | 1/2007 | Wang |
| 2007/0038483 A1 | 2/2007 | Wood |
| 2007/0043577 A1 | 2/2007 | Kasower |
| 2007/0059442 A1 | 3/2007 | Sabeta |
| 2007/0072190 A1 | 3/2007 | Aggarwal |

(56) References Cited

U.S. PATENT DOCUMENTS

| | | |
|---|---|---|
| 2007/0078985 A1 | 4/2007 | Shao et al. |
| 2007/0083460 A1 | 4/2007 | Bachenheimer |
| 2007/0093234 A1 | 4/2007 | Willis et al. |
| 2007/0094137 A1 | 4/2007 | Phillips et al. |
| 2007/0106582 A1 | 5/2007 | Baker et al. |
| 2007/0112667 A1 | 5/2007 | Rucker |
| 2007/0118393 A1 | 5/2007 | Rosen et al. |
| 2007/0192248 A1 | 8/2007 | West |
| 2007/0205266 A1 | 9/2007 | Carr et al. |
| 2007/0226093 A1 | 9/2007 | Chan et al. |
| 2007/0244807 A1 | 10/2007 | Andringa et al. |
| 2007/0288355 A1 | 12/2007 | Roland et al. |
| 2007/0299759 A1 | 12/2007 | Kelly |
| 2008/0010687 A1 | 1/2008 | Gonen et al. |
| 2008/0066188 A1 | 3/2008 | Kwak |
| 2008/0077526 A1 | 3/2008 | Arumugam |
| 2008/0103800 A1 | 5/2008 | Domenikos et al. |
| 2008/0103972 A1 | 5/2008 | Lanc |
| 2008/0126233 A1 | 5/2008 | Hogan |
| 2008/0147454 A1 | 6/2008 | Walker et al. |
| 2008/0167883 A1 | 7/2008 | Khazaneh |
| 2008/0175360 A1 | 7/2008 | Schwarz et al. |
| 2008/0255992 A1 | 10/2008 | Lin |
| 2008/0281737 A1 | 11/2008 | Fajardo |
| 2008/0288382 A1 | 11/2008 | Smith et al. |
| 2008/0294540 A1 | 11/2008 | Celka et al. |
| 2008/0319889 A1 | 12/2008 | Hammad |
| 2009/0044279 A1 | 2/2009 | Crawford et al. |
| 2009/0060343 A1 | 3/2009 | Rosca |
| 2009/0106150 A1 | 4/2009 | Pelegero et al. |
| 2009/0106846 A1 | 4/2009 | Dupray et al. |
| 2009/0125369 A1 | 5/2009 | Kloostra et al. |
| 2009/0126013 A1 | 5/2009 | Atwood et al. |
| 2009/0164380 A1 | 6/2009 | Brown |
| 2009/0182653 A1 | 7/2009 | Zimiles |
| 2009/0199264 A1 | 8/2009 | Lang |
| 2009/0222308 A1 | 9/2009 | Zoldi et al. |
| 2009/0240609 A1 | 9/2009 | Cho et al. |
| 2009/0254476 A1 | 10/2009 | Sharma et al. |
| 2009/0271248 A1 | 10/2009 | Sherman et al. |
| 2010/0030677 A1 | 2/2010 | Melik-Aslanian et al. |
| 2010/0043055 A1 | 2/2010 | Baumgart |
| 2010/0094664 A1 | 4/2010 | Bush et al. |
| 2010/0094768 A1 | 4/2010 | Miltonberger |
| 2010/0100945 A1 | 4/2010 | Ozzie et al. |
| 2010/0107225 A1* | 4/2010 | Spencer et al. ................... 726/4 |
| 2010/0114724 A1 | 5/2010 | Ghosh et al. |
| 2010/0114744 A1 | 5/2010 | Gonen |
| 2010/0114747 A1 | 5/2010 | Kasower |
| 2010/0121767 A1 | 5/2010 | Coulter et al. |
| 2010/0130172 A1 | 5/2010 | Vendrow et al. |
| 2010/0145836 A1 | 6/2010 | Baker et al. |
| 2010/0145840 A1 | 6/2010 | Kasower |
| 2010/0205662 A1 | 8/2010 | Ibrahim et al. |
| 2010/0229245 A1 | 9/2010 | Singhal |
| 2010/0250411 A1 | 9/2010 | Ogrodski |
| 2010/0250497 A1 | 9/2010 | Redlich et al. |
| 2011/0004498 A1 | 1/2011 | Readshaw |
| 2011/0016042 A1 | 1/2011 | Cho et al. |
| 2011/0196791 A1 | 8/2011 | Dominguez |
| 2012/0030771 A1 | 2/2012 | Pierson et al. |
| 2012/0158574 A1 | 6/2012 | Brunzell et al. |
| 2012/0265607 A1 | 10/2012 | Belwadi |
| 2012/0303514 A1 | 11/2012 | Kasower |
| 2013/0018811 A1 | 1/2013 | Britti et al. |
| 2013/0031624 A1 | 1/2013 | Britti et al. |
| 2013/0124392 A1 | 5/2013 | Achanta et al. |
| 2013/0173450 A1 | 7/2013 | Celka et al. |
| 2013/0211986 A1 | 8/2013 | Debie et al. |

FOREIGN PATENT DOCUMENTS

| | | |
|---|---|---|
| KR | 10-2004-0078798 | 9/2004 |
| WO | WO 01/84281 | 11/2001 |
| WO | WO 02/27610 | 4/2002 |
| WO | WO 03/071388 | 8/2003 |
| WO | WO 2004/046882 A2 | 6/2004 |
| WO | WO 2008/054403 | 5/2008 |
| WO | WO 2008/147918 | 12/2008 |
| WO | WO 2009/117518 | 9/2009 |
| WO | WO 2013/009920 | 1/2013 |

OTHER PUBLICATIONS

Access to fair credit reports: current practices and proposed legislation. Joseph Fisher. Fall 1981.*
Information sharing in credit markets. Marco pagano and Tullio Jappelli. Dec. 1993.*
U.S. Appl. No. 12/220,320, filed Jul. 23, 2008, Olof et al.
U.S. Appl. No. 12/705,489, filed Feb. 12, 2010, Bargoli et al.
U.S. Appl. No. 12/705,511, filed Feb. 12, 2010, Bargoli et al.
Cowie, Norman E., Warning Bells & "The Bust-Out", Business Credit, Jul. 1, 2000.
eFunds Corporation, Data & Decisioning, Debit Report, Apr. 1, 2007, http://www.efunds.com/web/industry-solutions/financial-services/frm-debit-report/htm.
Ettorre, Paul Kahn on Exceptional Marketing. Management Review, vol. 38(11), Nov. 1994, pp. 48-51.
Fair Isaac Introduces Falcon One System to Combat Fraud, Business Wire, May 5, 2005.
Fair Isaac Offers New Fraud Tool, National Mortgage News & Source Media, Inc., Jun. 13, 2005.
FinExtra, Basepoint Analytics Introduces Predictive Technology for Mortgage Fraud, May 10, 2005.
Ideon, Credit-Card Registry That Bellyflopped this Year, Is Drawing some Bottom-Fishers, The Wall Street Journal, Aug. 21, 1995, p. C2.
Industry News, New Technology Identifies Mortgage Fraud: Basepoint Analytics Launches FraudMark, Inman News, Oct. 5, 2005, American Land Title Association.
International Preliminary Report on Patentability and Written Opinion, PCT/US2008/064594, dated Dec. 10, 2009.
International Search Report and Written Opinion for PCT/US2007/06070, Nov. 10, 2008.
LifeLock, "How LifeLock Works," http://www.lifelock.com/lifelock-for-people, accessed on Mar. 14, 2008.
LifeLock, "LifeLock Launches First ID Theft Prevention Program for the Protection of Children," Oct. 14, 2005 Press Release, posted on http://www.lifelock.com/about-us/press-room/2005-press-releases/lifelock-protection-for-children, accessed on Mar. 14, 2008.
LifeLock; "How can LifeLock protect my kids and family?," http//www.lifelock.com/lifelock-for-people/how-we-do-it/how-can-lifelock-protect-my-kids-and-family, accessed on Mar. 14, 2008.
Tackling the Issue of Bust-Out Fraud, Retail Banker International, Jul. 24, 2007.
The Center for Financial Services Innovation, A Case Study of Checking Account Inquiries and Closures in Chicago, Nov. 2006.
Truston, "Checking if your child is an ID theft victim can be stressful," as posted by Michelle Pastor on Jan. 22, 2007 at http://www.mytruston.com/blog/credit/checking_if_your_child_is_an_id_theft_vi.html.
W.A. Lee, American Banker: The Financial Services Daily, Experian, on Deal Hunt, Nets Identity Theft Insurer, Jun. 4, 2003.
LifeLock, Various Pages, www.lifelock.com/, 2007.
Pagano, et al., "Information Sharing in Credit Markets," Dec. 1993, The Journal of Finance, vol. 48, No. 5, pp. 1693-1718.
BlueCava, "What We Do", http://www.bluecava.com/what-we-do/, downloaded on Nov. 5, 2012, pp. 3.
Chores & Allowances. "Do Kids Have Credit Reports?", Oct. 15, 2007, http://choresandallowances.blogspot.com/2007/10/do-kids-have-credit-reports.html.
"Consumers Gain Immediate and Full Access to Credit Score Used by Majority of U.S. Lenders." PR Newswire, ProQuest Copy; Mar. 19, 2001; p. 1.
Expensr.com http://www.expensr.com/, as retrieved on Sep. 17, 2008.

(56) References Cited

OTHER PUBLICATIONS

Gibbs, Adrienne; "Protecting Your Children from Identity Theft," Nov. 25, 2008, http://www.creditcards.com/credit-card-news/identity-ID-theft-and-kids-children-1282.php.
ID Theft Assist, "Do You Know Where Your Child's Credit Is?", Nov. 26, 2007, http://www.idtheftassist.conn/pages/story14.
Iovation, Device Identification & Device Fingerprinting, http://www.iovation.com/risk-management/device-identification, downloaded on Nov. 5, 2012, 6 pages.
Ogg, Erica, "Apple Cracks Down on UDID use", http://fifaom.com/apple/apple-cracks-down-on-udid-use/, downloaded on Nov. 5, 2012, 5 Pages.
Vamosi, Robert, "How to Handle ID Fraud's Youngest Victims," Nov. 21, 2008, http://news.cnet.com/8301-10789 3-10105303-57.html.
International Search Report and Written Opinion for Application No. PCT/US2012/046316 (EXP.283WO), dated Sep. 28, 2012.
International Search Report and Written Opinion for Application No. PCT/US09/037565 (EXP.317VPC), dated May 12, 2009.

\* cited by examiner

400

---

From: Credit Monitoring Service
To: John Doe
Subject: ATTENTION: There has been a change to your credit report!

Dear John:

A significant event has occurred in your credit data. There may be important changes that have been made that could affect your credit.

However, you have not provided sufficient verification data to enroll in our credit monitoring service. Click here to finish your enrollment with our service and receive further details regarding this significant event.

From: Credit Monitoring Service
To: John Doe
Subject: ATTENTION: There has been a change to your credit report!

Dear John:

A significant event has occurred in your credit data. There may be important changes that have been made that could affect your credit.

Click here to sign into your credit monitoring account in order to view further details regarding this significant event.

From: Credit Monitoring Service
To: John Doe
Subject: ATTENTION: Important information regarding your credit report Dear John:

As a valued customer of Online Website, we have been monitoring your credit data. As part of this monitoring we recently identified activity that could have an impact on your credit score and/or could indicate fraudulent activity associated with one or more of your financial accounts. If you would like to view further details regarding the identified activity, please click here to visit our sight and to sign up for a 30-day free trial of our credit monitoring service. Alternatively, please visit your existing credit monitoring service and review your current credit data.

FIGURE 7

INDIRECT MONITORING AND REPORTING OF A USER'S CREDIT DATA

CROSS-REFERENCE TO RELATED APPLICATIONS

This application claims the benefit of U.S. Provisional Pat. App. No. 61/316,994, filed Mar. 24, 2010, entitled "METHODS AND SYSTEMS FOR INDIRECT MONITORING AND REPORTING OF A USER'S CREDIT REPORT," which is incorporated by reference in its entirety.

BACKGROUND

Field

This disclosure generally relates to indirect monitoring of a user's credit data, and more particularly to methods and systems for indirect monitoring and reporting of changes to a user's credit data.

Description of the Related Art

Conventional credit monitoring services, such as those provided by current credit reporting bureaus, require the user to enroll into the credit monitoring service prior to the user being able to, for example, access their credit report from the credit monitoring service, or receive detailed alerts of changes to the user's credit data from the credit monitoring service that explain in detail what has changed. The enrollment process typically includes an extensive questionnaire that requires the user to provide enrollment information, including, for example, user identity information data, user credit data, user customized settings data, and identity verification data.

The identity verification data is provided to ensure that an unwanted third party is not able to gain access to the details of the user's credit information. In order for the enrollment process to be complete, so that users can view the details of their credit data (such as credit data included in a credit report provided to the consumer) or receive notification alerts of changes to their credit data from the credit monitoring service, users must provide sufficient identity verification data to the credit monitoring service. In some systems, if a user has not entered sufficient identification verification data, the credit monitoring service may determine that the user has not finished enrollment process and the credit monitoring service will not monitor the user's credit data or send notification alerts to the user.

However, in many instances the user does not provide sufficient identity verification data. This may occur even though the user has already paid for the service. The user may not provide the identity verification data because of time constraints, because the user does not have all necessary information on hand, or simply because the user forgets to provide the identity verification data.

This can result in the user thinking he has completed the registration process and is now enrolled within the credit monitoring service, even though the user has not finished the enrollment process. Or the user may be under the assumption that the identity verification data can be entered once the user is sent a notification alert by the credit monitoring service. However, this may not be the case, as conventional credit monitoring services do not monitor credit reports or send notification alerts to users that have not entered sufficient identity verification data.

Thus, the user is lulled into a false sense of security, because the user has likely paid for the service and expects the credit monitoring service to be monitoring the user's credit report and sending notification alerts to the user, despite not having entered sufficient identity verification data.

SUMMARY

This application provides methods and systems for indirect monitoring and reporting of changes to a user's credit report. The methods and systems provided herein may provide a notification alert of the fact that a change or a significant event has occurred in a user's credit report, without providing details as to what change or significant event has occurred, even if the user has not provided sufficient identity verification data. The methods and systems provided herein also may enable the user to save significant time in not having to complete the lengthy process of entering identity verification data, until, for example, a change or significant event to the user's credit report is detected by the credit monitoring service.

Once a change or significant event is detected by the credit monitoring service, some embodiments of the methods and systems provided herein may alert the user of the fact that a change or a significant event has occurred. In an embodiment, the notification alert does not provide any details of the change or the significant event, as such details are only provided to users that have entered sufficient identity verification data. Unlike existing credit monitoring services, the notification alert may elicit further investigation by the user who can then act immediately to provide the necessary identity verification data in order to obtain details of the change or the significant event. Thus, the user is incentivized to complete the authentication process (e.g., provide sufficient necessary identity verification data) for their own protection.

Accordingly, some embodiments described herein allow the user to be able to bypass the authentication steps (e.g., enter the identity verification data) during the enrollment process and still provide the user with the service of monitoring the user's credit report and notifying the user of the fact that a change or significant event has occurred. Thus, the user obtains the benefit of being enrolled with the credit monitoring service and the credit monitoring service can charge the user for its service, even if the user has not provided any identification verification data. When the user is notified that a change or significant event has occurred, the user can then finish the authentication process (e.g., provide sufficient identity verification data) in order to see the specific details of the change or significant event.

In one embodiment, a method for indirect monitoring and reporting of changes to a user's credit report is provided. The method includes providing a service, by a monitoring device, that allows the user to access the service via a communication terminal. The method may also include the service requesting enrollment data, including identity verification data, from the user. Further, the method may include the service periodically accessing and monitoring the user's credit report for a change in the user's credit report via a connection between the monitoring device and one or more credit bureaus (and/or agents of the credit bureaus) even if the monitoring device has not received any identity verification data from the user. Additionally, the method may include determining whether a change detected in the user's credit report is a significant event. When a significant event in the user's credit report is detected, the monitoring device may be configured to alert the user of the fact that a significant event has occurred, without providing details of the significant event, even if the data server has not received any identity verification data (and/or other enrollment information) from the user.

BRIEF DESCRIPTION OF THE DRAWINGS

FIG. 4 is an example of an alert email that may be sent to a user who has not provided sufficient identity verification data requested by the indirect credit monitoring service.

FIG. 5 is an example of an alert email that may be sent to a user who has provided sufficient identity verification data requested by the indirect credit monitoring service.

FIG. 7 is an example notification transmitted to a user.

DETAILED DESCRIPTION

Figure 1:
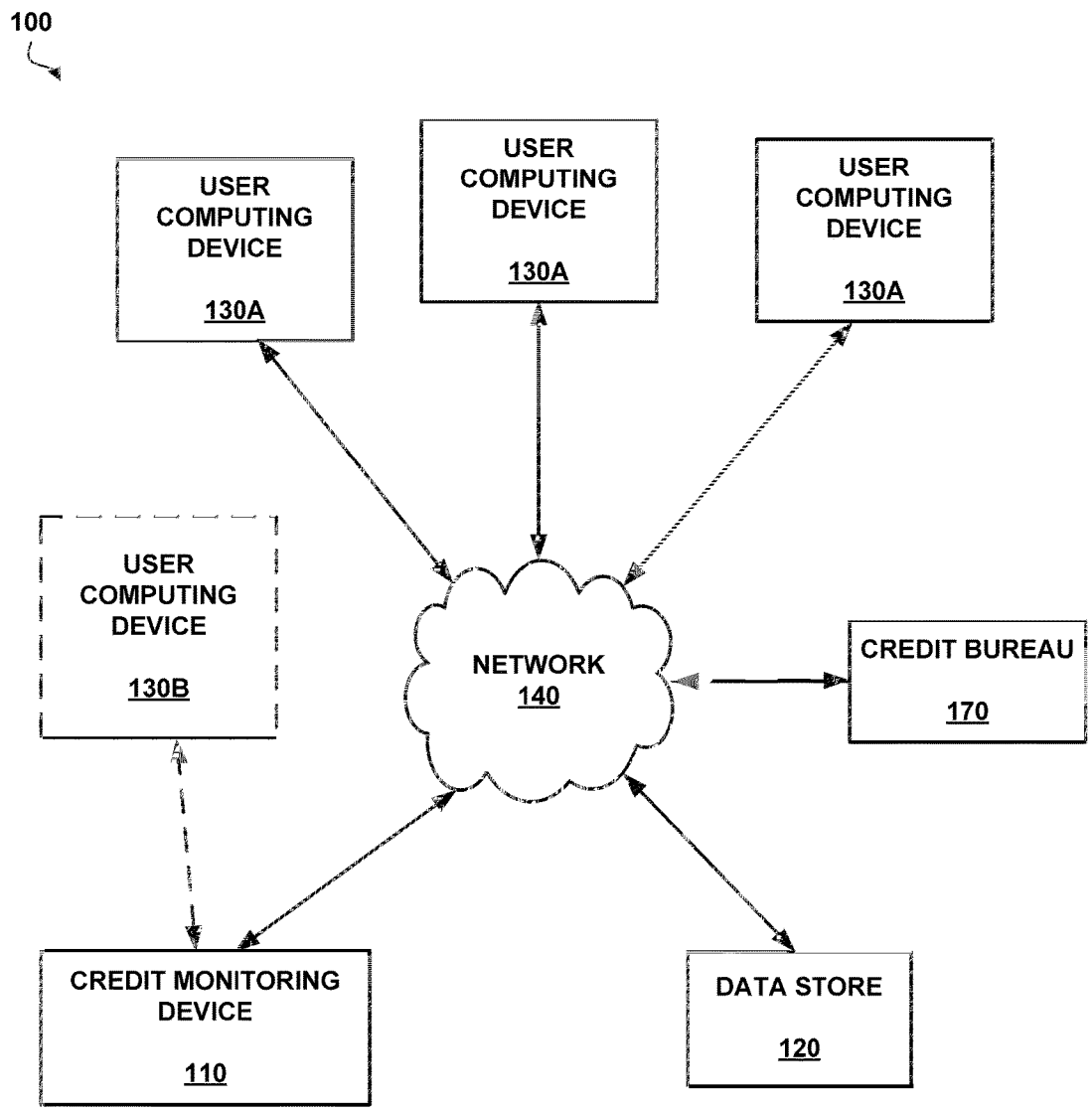
FIG. 1 is a high-level block diagram of a monitoring device in communication with a credit bureau, multiple user computing devices, and a data store.

In the following detailed description, reference is made to the accompanying drawings that form a part hereof, and in which is shown by way of illustration specific illustrative embodiments. These embodiments are described in sufficient detail to enable those skilled in the art to practice what is claimed, and it is to be understood that other embodiments may be utilized without departing from the spirit and scope of the claims. The following detailed description is, therefore, not to be taken in a limiting sense.

The embodiments presented herein are directed to methods and systems for indirect monitoring and reporting of changes to a user's credit report. In some embodiments, the methods and systems for indirect monitoring and reporting of changes to a user's credit report allows the user to become aware of the fact that a change or significant event has occurred in their credit report, without specific details as to the change or significant event. This may occur, for example, even if the user has completed enrollment in a credit monitoring service. For example, in one embodiment the credit monitoring service may monitor credit files of individuals that have not provided any enrollment information to the credit monitoring service. In other embodiments, the credit monitoring service may monitor credit files of individuals that have partially completed enrollment in a credit monitoring service, but have not provided all of the information necessary to complete the enrollment, such as not providing sufficient identity verification data. Thus, the user may be able to bypass the authentication steps during the enrollment process of the credit monitoring service, for example by not entering identity verification data into the system, while the system still provides the user with the service of monitoring the user's credit report and notifying the user when a change or a significant event to the user's credit report occurs, without providing details of the change or the significant event.

In one embodiment, examples of significant events in the user's credit report that would cause a notification alert to be sent to the user include, for example, an application for or an addition of a new credit line (e.g., a new credit card, loan or mortgage account). Other significant events may include, for example, a change of address, an account reported for collection, and other such events. In an embodiment, examples of changes in the user's credit report that may not cause a notification alert to be sent to the user include, for example, current payment notifications that change the total amount owed for a particular credit line. However, in other embodiments, the types of changes in the user's credit report that would cause a notification alert to be sent to the user can be modified based on the requirements of the credit monitoring service or the user. Thus, the events deemed significant by the system may, in an embodiment, be configurable by either the user or by an administrator of the service.

As the credit report is the basis of most credit scores, the embodiments herein thus advantageously ensure the user is aware of the fact that changes or significant events to the user's credit report have occurred even if the user has not provided sufficient identity verification data to the credit monitoring service. The embodiments described herein also allow the credit monitoring service to provide the user with a portion of the service the user may have already paid for even though the user has not yet provided sufficient information to complete enrollment in a credit monitoring service. Thus, the embodiments described herein allow the user to obtain the benefits of being enrolled in a credit monitoring service, even though the user has not yet finished providing sufficient enrollment data, such as identity verification data. Also, the embodiments described herein allow the indirect credit monitoring service to monitor the user's credit report and send notification alerts to the user that a change or a significant event has occurred, even though the user has not yet provided sufficient enrollment data.

In some embodiments, indirect credit monitoring (e.g., monitoring credit data of an individual that has not completed enrollment in a credit monitoring service) includes alerting users of any changes detected in the users' credit data (e.g., one or more credit reports may be accessed in order to detect changes in a particular user's credit data). In other embodiments, indirect credit monitoring includes alerting users of only changes detected in the user's credit data that are determined to be significant events. The rules for determining whether a change to a user's credit data is a significant event can be set by the credit monitoring service and/or by the user.

Enrollment information may include, for example, user identity information data, user credit data, user customized settings data, and/or identity verification data. User identity data may include, for example, name, home address, home and work phone numbers, social security number, and/or driver's license number. User credit data may include, for example, credit card information of credit cards used by the user, loan and mortgage information, and/or savings and checking bank account information. User customized settings data may include, for example, username settings, payment for service information, preferred alert communication information, and/or the like. Identity verification data includes password settings, security questions and answers and/or any other data used to prevent unwanted third parties from gaining access to the user's credit information stored in the service database. Depending on the embodiment, the credit monitoring service may use all of the above data or any subset thereof, and may also use other such data, for enrolling individuals in a credit monitoring service.

Depending on the embodiment, various communications options may be employed in order to alert the user of changes or significant events to the user's credit report. Email to the user is described in detail as one form of communication used by various embodiments. However, other forms of communication may also be used to alert users of changes or significant events in the respective user's credit report. Such communication options include, for example, email, text message (e.g., short messaging service—SMS), courier mail, voice message, telephone calls, social networking systems, MMS messages, postal mail, and so forth. Combinations of communication options may be used as well, for example to more efficiently reach a user. In an embodiment, the mode or modes of communication employed for a particular alert are chosen based on the nature or content of the alert. For example, in an embodiment, the system would determine whether a particular credit alert is urgent or not, and it would send urgent alerts by text message or phone to ensure a faster response from the user, while sending non-urgent alerts by email in order to avoid having the user incur telecommunications costs.

FIG. 1 is a high-level block diagram of an of a monitoring device 110 in communication with a credit bureau 170, multiple user computing devices 130, and a data store 120. In one embodiment, the monitoring device 110 acts as the central location for credit monitoring, including indirect credit monitoring of individuals that have not completed enrollment. The monitoring device 110 comprises one or more computer processors, either within a single computing device or within several computing devices connected by a network or other form of communication. The monitoring device 110 may further be configured to communicate with external data sources, such as public records data sources. The monitoring device 110 may also maintain data records such as public records internally or at the data store 120. These records may be used, for example, to verify enrollment information received from users.

The data store 120 stores enrollment information including user identity data, user credit data, user customized settings data, and/or identity verification data. The data store 120 may also store credit information obtained from the credit bureau 170 (or other sources of credit data). The data store 120 may be internal to the monitoring device 110 or external to the monitoring device 110 and operated on separate computing devices. In an embodiment, the data store 120 is operated by an external service provider. In an embodiment, the monitoring device 110 communicates with the data store 120 via a standard protocol such as HTTP or ODBC. The data store 120 may be a relational database such as a SQL database, or a non-relational database.

A user of the user computing devices 130A can access the indirect credit monitoring service, hosted by the monitoring device 110, via the network 140, which may include one or more of any available networks, such as local area networks, personal area networks, wide area networks, and/or the Internet. The user computing devices 130A can be any type of device that can access the network 140, such as, for example, a desktop computer, a laptop computer, a mobile phone, or any other suitable device. The user computing devices 130A may communicate with the monitoring device 110 via any number of networking protocols, whether standard protocols or protocols specifically developed for the application. In an embodiment, the user computing devices 130 communicate using web pages via an HTTP or HTTPS protocol.

A user of the user computing device 130B, can also access the indirect credit monitoring service, hosted by the monitoring device 110, via a direct line 150. In one embodiment, the user computing device 130B is a land line telephone or a mobile phone and the direct line 150 is a telephone line. In this embodiment, the user calls a telephone number that provides the user access to the monitoring device 110. The user may interact with the monitoring device 110 using an automated voice prompt service, for example, which may recognize user input based on either dial-tone numbers or voice recognition. Additionally, other communications protocols such as SMS text messages may be used to communicate between the user computing device 130B and the service. In an embodiment, the communication is not directly between the user computing device 130B and the monitoring device 110, but rather is transmitted through one or more intermediary devices.

In the embodiment of FIG. 1, the monitoring device 110 is also in communication with the credit bureau 170 via a secure data line 160. The implementation 100 allows the monitoring device 110 to act as a hub between users and the credit bureau 170 in order to monitor and report the fact that a change or a significant event has occurred to the user's credit report. In other embodiments, the monitoring device 110 communicates with the credit bureau, and/or other credit data devices, via the network 140.

Figure 2:
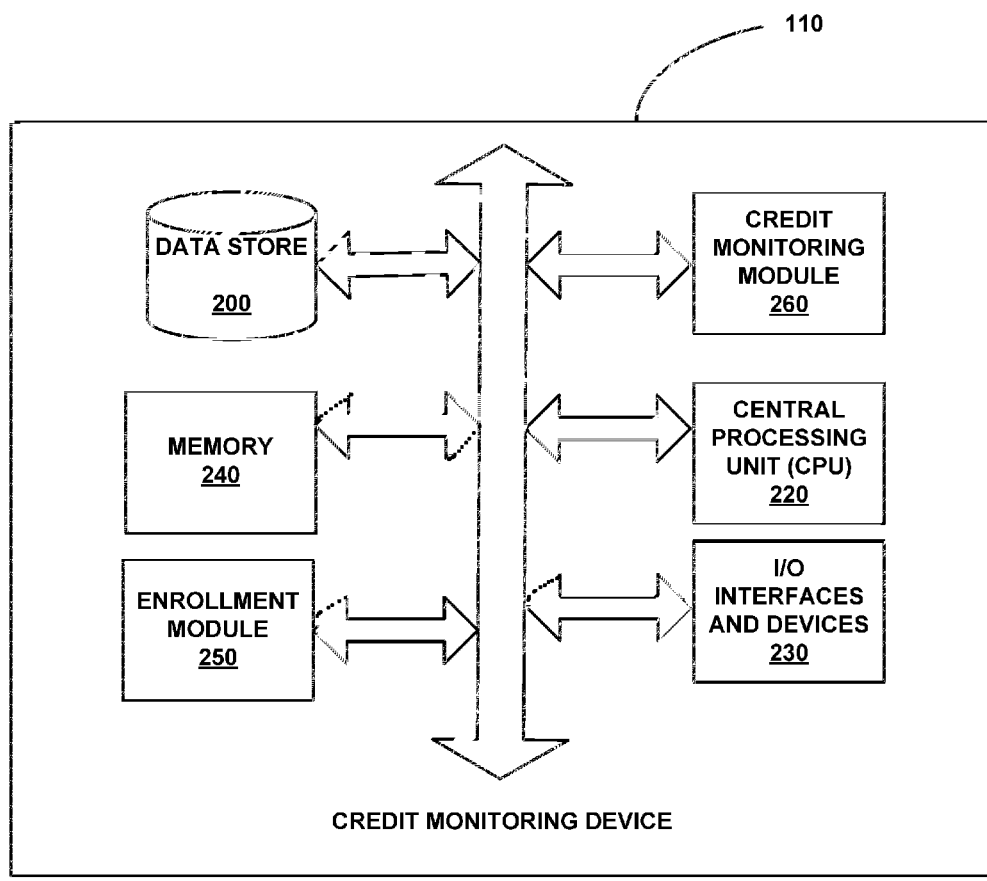
FIG. 2 is a block diagram illustrating one embodiment of the credit monitoring device of FIG. 1.

FIG. 2 is a block diagram illustrating one embodiment of the credit monitoring device 110 (FIG. 1). In one embodiment, the credit monitoring device 110 is configured to interface with multiple devices and/or data sources, such as in the exemplary network configuration of FIG. 1. The credit monitoring device 110 may be used to implement certain systems and methods described herein. For example, in one embodiment the credit monitoring device 110 may be configured to monitor credit data of consumers, including consumers that have not completed enrollment in a credit monitoring service (e.g., the consumers may not have completed a validation, or other, portion of enrollment). The functionality provided for in the components and modules of the credit monitoring device 110 may be combined into fewer components and modules or further separated into additional components and modules.

In general, the word module, as used herein, refers to logic embodied in hardware or firmware, or to a collection of software instructions, possibly having entry and exit points, written in a programming language, such as, for example, C, C++, or C#. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules may be stored in any type of computer-readable medium, such as a memory device (e.g., random access, flash memory, and the like), an optical medium (e.g., a CD, DVD, BluRay, and the like), firmware (e.g., an EPROM), or any other storage medium. The software modules may be configured for execution by one or more CPUs in order to cause the credit monitoring device 110 to perform particular operations.

It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In one embodiment, the credit monitoring device 110 includes, for example, one or more server or a personal computer that is IBM, Macintosh, or Linux/Unix compatible. In another embodiment, the credit monitoring device 110 comprises one or more laptop computer, smart phone, personal digital assistant, or other computing device, for example. In one embodiment, the credit monitoring device 110 includes one or more central processing units ("CPU") 220, which may include one or more conventional or proprietary microprocessors. The credit monitoring device 110 further includes a memory 240, such as random access memory ("RAM") for temporary storage of information and a read only memory ("ROM") for permanent storage of information, and a data store 200, such as a hard drive, diskette, or optical media storage device. In certain embodiments, the data store 200 stores credit data of consumer local to the credit monitoring device 110. For example, the data store 200 may store previous credit data of consumers that are monitored by the credit monitoring service so that new credit data received from a credit bureau may be compared to the stored data in order to identify possible significant changes in the credit data. Depending on embodiment, such data may be stored on one or both of the data store 200 and/or the data store 120 (FIG. 1). Embodiments of data store 200 may store data in databases, flat files, spreadsheets, or any other data structure known in the art. Typically, the modules of the credit monitoring device 110 are in communication with one another via a standards based bus system. In different embodiments, the standards based bus system could be Peripheral Component Interconnect (PCI), Microchannel, SCSI, Industrial Standard Architecture (ISA) and Extended ISA (EISA) architectures, for example. In another embodiment, the credit monitoring device 110 leverages computing and storage services available over the Internet (cloud computing).

The credit monitoring device 110 is generally controlled and coordinated by operating system and/or server software, such as the Windows 95, 98, NT, 2000, XP, Vista, Linux, SunOS, Solaris, PalmOS, Blackberry OS, or other compatible operating systems. In Macintosh systems, the operating system may be any available operating system, such as MAC OS X. In another embodiment, the credit monitoring device 110 may be controlled by a proprietary operating system. Conventional operating systems control and schedule computer processes for execution, perform memory management, provide file system, networking, and I/O services, and provide a user interface, such as a graphical user interface ("GUI"), among other things.

The exemplary credit monitoring device 110 may include one or more commonly available input/output (I/O) devices and interfaces 230, such as a keyboard, mouse, touchpad, and printer. In one embodiment, the I/O devices and interfaces 230 include one or more display device, such as a monitor, that allows the visual presentation of data to a user. More particularly, a display device provides for the presentation of GUIs, application software data, and multimedia presentations, for example. In one embodiment, I/O devices and interfaces 230 comprise devices that are in communication with modules of the credit monitoring device 110 via a network, such as network 140 and/or any secured local area network, for example. In the embodiment of FIG. 2, the I/O devices and interfaces 230 provide a communication interface to various external devices. For example, in this embodiment the credit monitoring device 110 is in communication with the network 140, such as any combination of one or more LANs, WANs, or the Internet, for example, via a wired, wireless, or combination of wired and wireless, connections via a network interface of the I/O devices and interfaces 230.

In the embodiment of FIG. 2, the credit monitoring device 110 also includes application modules that may be executed by CPU 220. More particularly, the application modules include enrollment module 250 and credit monitoring module 260. In one embodiment, the enrollment module 250 provides user interfaces and receives responses from consumers for the purpose of enrolling the consumers into a credit monitoring service. In order for enrollment to complete, a predetermined set of information is required from a consumer, such as demographic information, authentication information, payment information, and/or other information. As described further below, in some embodiments credit monitoring may be performed prior to the enrollment module 250 receiving all of the required enrollment information. In such an embodiment, the credit monitoring device 110 may provide a simple notice to a consumer when activity has been detected in the consumer's credit data, but only provide details of the activity after any missing enrollment information is provided to the enrollment module 250. The credit monitoring module 260 is configured to monitor credit data associated with each of a plurality of consumers. Credit monitoring may be performed in any known manner, such as by comparison of new credit data (e.g., a current month's credit report) with older credit data (e.g., a past month's credit report).

Figure 3:
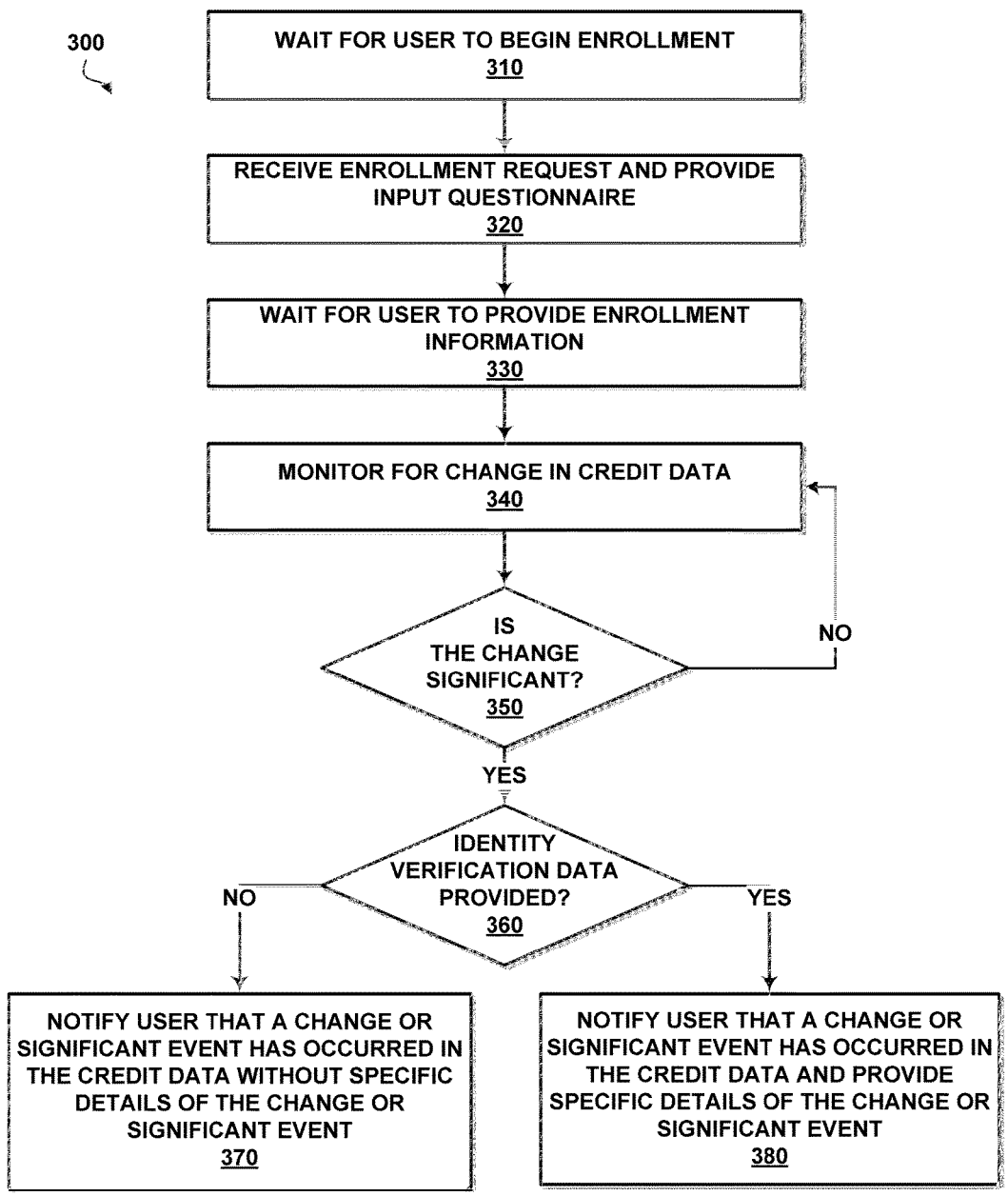
FIG. 3 is a flowchart illustrating one embodiment of a method of monitoring credit data of users.

FIG. 3 is a flowchart illustrating one embodiment of a method of monitoring credit data of users, including monitoring of credit data of users that have not completed enrollment with the credit monitoring service. The method may be performed on a system such as that monitoring device 110 of FIG. 1, or on another system. Depending on the embodiment, the method of FIG. 3 may include fewer or additional blocks and/or the blocks may be performed in a different order than is illustrated.

The method 300 begins at block 310 where the indirect credit monitoring service, hosted by the monitoring device 110, waits for a user to access and request enrollment into the indirect credit monitoring service to monitor and report changes or significant events to the user's credit report. As shown in FIG. 1, the user can access the indirect credit monitoring service, hosted by the monitoring device 110, via the network 140 using one of the plurality of user computing devices 130A or via the direct line 150 using the user computing device 130B. The method 300 then proceeds to block 320.

At block 320, the monitoring device 110 receives an enrollment request from the user and the monitoring device 110 provides an input questionnaire to the user to get enrollment information (e.g., user identity data, user credit data, customized settings data, and/or identity verification data) from the end user. In one embodiment, the questionnaire is presented to the user as one or more HTML forms with which the user can submit responses. The questionnaire may also be presented in other forms, such as by telephone voice prompts, emails, text messages, and so forth. In an embodiment, the monitoring device 110 provides multiple ways for users to respond to the questionnaire, so that users have options as to how to provide responses to the system. In one embodiment, the monitoring device 110 uses responses from the user to determine further enrollment information to request. For example, if the user indicates having a home mortgage, the system may request information about the particular home and the amount of the mortgage, but not ask those detailed questions if the user does not indicate having a home mortgage. Additionally, the user may provide payment information in embodiments where the credit monitoring service, or indirect credit monitoring service, require payment, either before the questionnaire, after the questionnaire, or at both times. The method 300 then proceeds to block 330.

At block 330, the monitoring device 110 then waits for the user, using one of the plurality of user computing devices 130A-B, to provide enrollment information in response to questions included in the input questionnaire. Enrollment information received by the monitoring device 110 may then be stored in the data store 120. In an embodiment, a user account is located or created for the user, and the enrollment information received and stored in the database is associated with the appropriate user account.

In one embodiment, the user is provided with an option to enroll in an indirect monitoring service and, thus, certain information regarding the user, such as validation information, is not requested by the monitoring device 110. Alternatively, the monitoring device 110 may request enrollment information that is sufficient to complete enrollment of the user in a full monitoring service that provides alert details to users without later requiring further enrollment information. In this embodiment, if the user fails to provide sufficient information to complete enrollment in the monitoring service, the monitoring device 110 may default to enrolling the user in an indirect monitoring service. Depending on the embodiment, certain minimum information requirements may be required before enrolling the user even in the indirect monitoring service.

In other embodiments, users may be enrolled in an indirect monitoring service without directly providing any information to the credit monitoring device 110, possibly without ever contacting the credit monitoring service (e.g., via a website provided by the credit monitoring device 110). For example, if compliant with applicable credit monitoring regulations, the credit monitoring device 110 may receive names of users to add to the indirect credit monitoring service from sources other than the users themselves, such as from merchants or lenders with which the users have done business. Thus, in one embodiment a user may receive an alert of potentially fraudulent activity in the user's credit data without the user ever providing enrollment information to a credit monitoring service (e.g., the user's identification information may have been provided to the credit monitoring service by a lender of the user). Accordingly, in certain embodiments the method of FIG. 3 does not include blocks 310, 320 and/or 330.

Also, at this point or at other points during this method, the monitoring device 110 may verify the enrollment information. For example, address data may be verified against public records data. Data may also be checked to ensure that it is not conflicting: for example, a ZIP code may be checked to ensure that it is within the city and state specified by the user. Other information, such as biographical information about the user, credit information, and any other information received by the monitoring device 110, may be verified by the system. In an embodiment, the monitoring device 110 notifies the user if information cannot be verified or is found to be inconsistent or incorrect. The monitoring device 110 may also discard or attempt to correct such information.

Alternatively, or in addition to, presenting the user with a questionnaire and receiving responses, the monitoring device 110 may also collect enrollment information from third-party sources. For example, information about a user's home or work address may be collected from public data sources, from third-party associates, or other sources of data.

The method 300 then proceeds to block 340 where the monitoring device 110 periodically accesses and monitors the user's credit data and waits for a change in the user's credit data. In one embodiment, the monitoring device 110 accesses and monitors the user's credit data on a daily basis. In other embodiments the monitoring device 110 can access and monitor the user's credit data on an hourly, weekly, monthly, quarterly or yearly basis, based on the needs of the indirect credit monitoring service or the user. In an embodiment, the monitoring device 110 is configured to automatically receive notifications from a credit report service, where the credit report service offers such notifications. Credit data, as discussed herein, includes any portion of data that is maintained by one or more credit bureaus and/or is derived from such data. For example, credit data may include some or all of the data that is provided in credit reports that are provided to consumers/lenders. Credit data may include additional data that is not included in credit reports.

In some embodiments, where only significant events detected in the user's credit report are alerted to the user, the flowchart 300 proceeds to block 350 when the monitoring device 110 identifies a change in the user's credit report. In other embodiments, where any change detected in the user's credit report is alerted to the user, the flowchart 300 proceeds to block 360 when the monitoring device 110 identifies a change in the user's credit report.

In embodiments that include block 350, the monitoring device 110 determines whether the change detected in the user's credit report is a significant event. In these embodiments, the indirect credit monitoring service or the user has specified certain changes in the user's credit report that are significant events worth noting to the user. Examples of changes in the user's credit report that can be considered a significant event include, for example, an application for or an addition of a new credit line (e.g., a new credit card, loan or mortgage account). Other significant events include, for example, a change of address, an account reported for collection, and so forth. If the monitoring device 110 determines that the change detected in the user's credit report is a significant event, the flowchart 300 proceeds to block 360. If the monitoring device 110 determines that the change detected in the user's credit report is not a significant event, the flowchart 300 proceeds back to block 340.

The determination of whether an event is significant may be based on any number of factors. For example, the type of event, as described above, may be used to determine whether an event is significant. User-specified preferences or administrator-provided settings may also be used in making the determination. In an embodiment, the determination of whether an event is significant for a user depends on the enrollment information that the user has provided. So, for example, if the user has provided sufficient enrollment information, then the system may deem more or fewer events significant than if the user has not provided sufficient enrollment information.

At block 360, the monitoring device 110 accesses the data store 120 and determines whether the user has provided sufficient identity verification data. If the monitoring device 110 determines that the user has not provided sufficient identity verification data, the flowchart proceeds to block 370. If the monitoring device 110 determines that the user has provided sufficient identity verification data, the flowchart proceeds to block 380. The particular identity verification data may include all of the enrollment data, or it may be any subset of that enrollment data. In an embodiment, determining whether sufficient identity verification data has been provided involves determining whether all of the requested identity verification data has been provided. In other embodiments, the system may only require a subset of the identity verification data to be provided. For example, the system may request three forms of ID but only require two for verification. The subset of identity verification that is required may depend on characteristics of the user assessed from the enrollment information or from other sources, in an embodiment. For example, the system may require more identity verification data if a user is determined to have a history of identity theft or if there is a freeze or hold placed on the user's credit accounts. The monitoring device 110 may apply one or more authorization rules to perform this determination. The authorization rules may be fixed or modifiable by an administrator or other entity, and may be embodied in executable code, preference settings, configuration files, data tables, or the like.

In an embodiment, the block 360 determination of whether the user has provided sufficient identity verification data is performed prior to initiating monitoring at block 340. In such an embodiment, the system may store the result of the determination in association with the user, and thereafter, when the user is to be notified of an event, the system uses the stored result of the determination in order to determine the type of alert to send to the user. In another embodiment, the system determines whether the user maintains separate lists or queues of users who have provided sufficient identity verification data and users who have not provided sufficient identity verification data, and then responds to events based on the queue or list in which the associated user is placed.

At block 370, the monitoring device 110 prepares and sends an alert message to the user that a change and/or a significant event has been detected in the user's credit data. The alert message can be sent to the user, for example, via email, via text message, via courier mail, via voice message, or via other communications methods described in this specification or known to those of skill in the art. FIG. 4 is an example email that may be sent to a user in order to notify the user that significant activity has been detected in the user's credit data (e.g., block 370). The email of FIG. 4 does not provided details regarding the detected activity, but does include instructions that may be followed by the consumer in order to obtain details regarding the detected activity. For example, the consumer may visit a website of the credit monitoring service and complete enrollment into a credit monitoring program in order to have access to details regarding the detected activity. The details omitted from the communication may include, in various embodiments, identifying information relating to the user, dollar amounts and/or account balances relating to the credit event, credit card numbers, account numbers, address information, loan information, credit scores, and/or other such credit-related or personal information. In some embodiments, the information to be omitted may be specified by an administrator of the credit monitoring service or by the user.

Depending on the embodiment, the content of the emails of Figure is determined by system settings set by an administrator of the system, user preference settings, and/or the event that was detected. These settings may determine, among other things, the address to which the emails are sent, the time of day or day of the week when the email is sent, the level of detail to be sent, the text content of the email, the reply address for the email, and so on. Additionally, the system settings may indicate whether the alert is to be sent by email or by other communication means. In an embodiment, the system sends multiple communications, of the same type or of different types, to the user on a periodic basis after the event is detected.

The embodiments described above and other embodiments allow the user to become aware of the fact that a change or significant event to their credit data has occurred even if the user has not provided sufficient identity verification data required to finish enrollment with the indirect credit monitoring service. They also allow the indirect credit monitoring service to provide the user with a portion of the service the user may have already paid for even though the user has not provided sufficient identity verification data. Once the alert message is sent to the user, the method then proceeds back to block 350.

At block 380, the monitoring device 110 prepares and sends a detailed alert message to the user that a change or significant event in the user's credit data has been detected. The detailed alert message can be sent to the user, for example, via email, via text message, via courier mail, via voice message, or via other communications methods described in this specification or known to those of skill in the art. FIG. 5 is an example email may be sent to a user that has completed enrollment in a credit monitoring program, in response to detection of significant activity in the user's credit data (e.g., block 380). In the embodiment of FIG. 5, the notification does not provide the specific details of the detected activity, but in other embodiments, and as authorized by applicable regulations, such an email notification may include details regarding the particular detected activity. For example, in other embodiments, the email 500 may both notify the user of the fact that a significant event in the user's credit data has been detected, and also specify in detail what has changed in the credit data. The example email 500 also provides a hyperlink for the user to access the indirect credit monitoring service, hosted by the monitoring device 110, in order to see the user's credit data in detail or to correct a possible error in the credit data. Once the alert message is sent to the user, the method then proceeds back to block 350. While email 500 notifies the user that a significant event in the user's credit data has been detected, in other embodiments, the email will alert the user of any change in the user's credit data. The details included the communication may include, in various embodiments, identifying information relating to the user, dollar amounts and/or account balances relating to the credit event, credit card numbers, account numbers, address information, loan information, credit scores, and/or other such credit-related or personal information. In some embodiments, the information to be included may be specified by an administrator of the credit monitoring service or by the user.

In an embodiment, the content of email 500 is determined by system settings set by an administrator of the system, user preference settings, and/or the event that was detected. These settings may determine, among other things, the address to which email 500 is sent, the time of day or day of the week when the email is sent, the level of detail to be sent, the text content of the email, the reply address for the email, and so on. Additionally, the system settings may indicate whether the alert is to be sent by email or by other communication means. In an embodiment, the system sends multiple communications, of the same type or of different types, to the user on a periodic basis after the event is detected.

Figure 6:
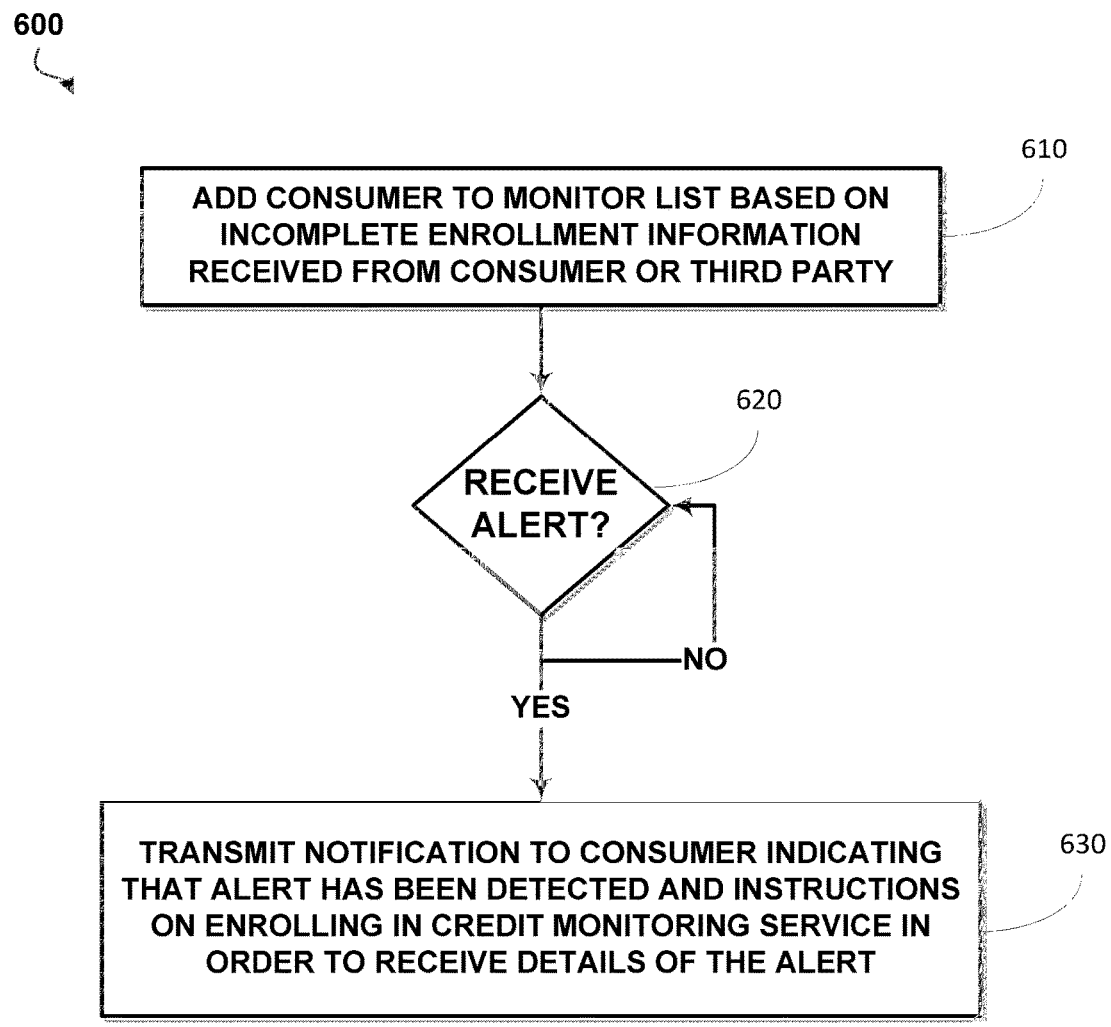
FIG. 6 is a flowchart illustrating one embodiment of a method of providing credit monitoring alerts.

FIG. 6 is a flowchart illustrating one embodiment of a method that may be performed by the monitoring device 110 in order to provide credit monitoring alerts to enrolled consumers. Depending on the embodiment, the method of FIG. 6 may include fewer or additional blocks and/or the blocks may be performed in a different order than is illustrated.

Beginning in block 610, a consumer is added to a monitor list maintained by the monitoring device 110. In one embodiment, the consumer information is provided directly by the consumer, such as via an enrollment form that has been partially completed by the consumer (e.g., either online or in paper form). In other embodiments, the consumer information may be provided from other sources, such as from a merchant that has recently completed a transaction with the consumer. For example, a commercial website may provide consumer information to the credit monitoring device 110 that is sufficient to allow the credit monitoring device 110 to monitor the credit information of the consumer.

Next, in block 620, the monitoring device periodically performs an analysis of the credit data associated with the consumer in order to determine if changes in the credit data, such as the significant events discussed above, have occurred. In some embodiments, the actual analysis of credit data is performed by a separate entity, such as by a credit bureau or agency of a credit bureau. When an indication of activity with respect to the consumer's credit data (e.g., "an alert") is received by the monitoring device 110, the method continues to block 630 where a notification of the detected activity is transmitted to the consumer. In one embodiment, a notification such as the sample notification 700 of FIG. 7 may be transmitted directly to the consumer. As shown in the example of FIG. 7, in certain embodiments the consumer is provided with information indicating that activity with respect to the consumer's credit data has been undetected, and is provided with an opportunity to view details regarding the activity by enrolling in a credit monitoring service. Thus, such a monitoring service that monitors credit data of non-enrolled consumers may increase enrollment into the credit monitoring service because consumers are encouraged to enroll in the credit monitoring service in response to receiving notifications that there is activity in the consumer's credit data. In other embodiments, notification of activity in the consumer's credit data may be provided to the consumer via the entity that provided that consumers information to the monitoring device 110. For example, if the consumers identification information was provided to the credit monitoring device 110 by a commercial website, alerts regarding activity in the consumer's credit data may be provided to the consumer via the commercial website, such as via a messaging system (e.g., an e-mail system) that is accessible through the commercial website. The notification may be transmitted in any other manner, such as via text messages, voice calls, or via a mail service, for example.

In a further embodiment, the monitoring device 110 of FIG. 1 is configured to allow users to log in to the system and review their credit data manually. In this embodiment, a user may log into the system and then request information about the user's credit history, for example by clicking on a hyperlink or otherwise specifying a command. The monitoring device 110, upon receiving the request, determines whether the user has provided sufficient identity verification information. The determination may be performed in real time, or the system may have previously made such a determination and stored the result of the determination, in which case the system looks up the stored result. Based on the determination, the monitoring device 110 may present the user with the requested information in response to determining that the user has provided sufficient identity verification information, or the monitoring device 110 presents the user with a request for identity verification information otherwise. Thus, in this embodiment, the system ensures that the user has provided sufficient identity verification information prior to presenting requested information about the user's credit report that may be confidential or otherwise sensitive. Such a system could be implemented alone or in combination with an embodiment of the monitoring system as described previously.

In one embodiment, the monitoring device includes an administration module configured to receive and store system configuration information. Configurability of the system may be useful, for example, where the desired alerts, enrollment information, or other aspects of the system should be easily changeable to meet consumer demands, legal requirements, marketing campaigns, and so on. The administrative module may include security features to ensure that unauthorized users cannot access the administrative module, such as a password or encryption key system. The administrative module may be accessible as web pages, via a desktop application, directly at the data server, or by other means.

An administrative module may enable an administrator to configure the enrollment information to be requested. It may also allow configuration of how the information is requested. For example, an administrator may be able to select an order in which the enrollment information is requested or separate the information into several pages. In a system that uses a telephone service, an administrator may, for example, be able to record voice prompts and select the options available to users. The administrator may also be able to configure what information is mandatory and optional, set what information is sufficient to begin monitoring, set what information is sufficient to provide detailed alert information, and so on. This may be provided in the form of rules or requirements specified by the administrator. The administrator may also be able to configure payment systems to receive payments from users.

The administrative module may also allow for configuration of alerts to be sent to users. The administrator may be able to define means of communication and provide the content of particular communications, such as by providing a template email or template sound recording. The administrator may also be able to configure the determination of which events are significant and to be reported. For example, the administrator may specify directly that certain types of events are significant, or provide rules for determining the significance of events. In some embodiments, the consumer may specify which events are significant, and possibly have various levels of significance that each are associated with different notification actions. Thus, the administrative module may provide an administrator with the ability to specify different levels or scores of significance. The administrator may also be able to configure the amount of information that is displayed or presented to a user when that user has or has not provided sufficient identity verification information to the system.

The administrative module may also allow for configuration for receiving alerts from credit bureaus or receiving data from other third-party sources. For example, the administrator may be able to select different credit bureaus from which information is to be collected. The administrator may also be able to specify the frequency of collecting information. In certain embodiments, the consumer may be able to customize certain of the settings discussed with respect to the administrative module.

In an embodiment, the monitoring device 110 verifies the user's enrollment information or identity verification information multiple times. In one embodiment, this is done on a periodic basis, and in another embodiment, this is done upon receiving events or other activities on the system. The repeated verification may include repeatedly determining if sufficient identity verification information has been provided, determining if the provided information is still accurate, or a combination of these and other verifications. Such repeated verification may be advantageous, for example, to detect when a user's personal information has changed, so as to avoid communicating with an outdated address, for example. It may also be advantageous in that it may detect identity theft. In the case where the user's information is determined to be no longer valid, the system may take appropriate precautionary measures, including, for example, alerting the user. The monitoring device 110 may also then treat the user as not having provided sufficient identity verification information, and thus send less detailed alert information to the user, as described in this specification.

The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

What is claimed is:

1. A method of monitoring a user's credit data to determine a risk of identity theft of the user in which an online credit monitoring service is provided and the user is required to enroll in the service by providing online sufficient information to reliably verify identity of the user, wherein the method addresses the problem of receiving insufficient enrollment information from the user, the method comprising:

by a computer system comprising:
 a credit data warehouse comprising millions of credit files relating to a corresponding millions of users;
 a plurality of user computing devices, each user computing device associated with a user who has at least one account with at least one of the lenders that report the credit information to the credit data warehouse;
 a credit monitoring server providing a credit monitoring service to the users of the user computing devices, the credit monitoring server comprising:
  an enrollment module that
   delivers one or more web pages to a user computing device for enrollment of a user of the user computing device in the credit monitoring service; and
   receives a request for credit monitoring of the user;
   receives identifying information relating to the user in response to the user receiving the one or more web pages, the one or more web pages for presentation to the user via the user computing device and requesting identifying information sufficient to authorize reporting, to the user, a credit history of the user;
   determines whether the identifying information relating to the user is sufficient to authorize reporting of the credit history to the user; and
   in response to determining that the identifying information is sufficient, identifying the user as a complete enrollee of the credit monitoring service; or
   in response to determining that the identifying information is not sufficient, identifying the user as an incomplete enrollee of the credit monitoring service; and
   save the information received while identifying the information lacking to identify the user as a complete enrollee;
  a credit monitoring module for delivering notices to the user computing devices indicating changes in their respective credit information in the credit data warehouse, wherein the credit monitoring module:
   periodically monitors credit history of the user in the credit data warehouse to identify credit history events therein;
   in response to identifying a credit history event in the credit history of the user:
    determining whether the user is a complete enrollee in the credit monitoring service;
    in response to determining that the user is a complete enrollee in the credit monitoring service, transmitting, by the credit monitoring server, to the user computing device of the user, an enrollee alert message regarding the credit history event, which includes detailed information regarding the credit history event and a link to access further information in the credit history of the user, or
    in response to determining that the user is not a complete incomplete enrollee in the credit monitoring service:
     transmitting, by the credit monitoring server, to the user computing device of the user, an alert message regarding the credit history event providing only a portion of the detailed information regarding the credit history event;
     providing to the user an option to complete enrollment in the credit monitoring service;
     providing to the user a webpage indicating the information lacking to become a complete enrollee;
     receiving from the user the lacking information; and
     transmitting to the user the detailed information regarding the credit history event in response to the user completing enrollment in the credit monitoring service.

2. The method of claim 1, wherein the request is received from the user.

3. The method of claim 1, wherein the request is received from a third party.

4. The method of claim 3, wherein the alert message is transmitted to the user via the third party.

5. The method of claim 3, wherein the enrollee alert message is transmitted to the user via the third party.

6. The method of claim 1, wherein transmitting, by the credit monitoring server, to the user the alert message comprises transmitting the alert message via a communication medium specified by the user.

7. The method of claim 1, wherein identifying, by the credit monitoring server, a credit history event comprises receiving a notification of the credit history event from a credit bureau and determining whether the credit history event is significant, based at least in part upon factors stored by the computer system.

8. The method of claim 7, wherein the factors stored by the computer system comprise user-specified factors.

9. The method of claim 7, wherein at least a portion of the factors stored by the computer system relate to whether the user has completed enrollment in the credit monitoring service.

10. The method of claim 1, wherein identifying, by the credit monitoring server, a credit history event comprises periodically retrieving credit data from a credit bureau and identifying a change in the periodically retrieved credit data relating to the user.

11. The method of claim 1, wherein the alert message provided to the not complete enrollees includes no personal credit information of the user.

12. The method of claim 1, wherein transmitting, by the computer system, to the user the enrollee alert message comprises transmitting the enrollee alert message via a communication medium specified by the user.

13. The method of claim 1, wherein the detailed information regarding the credit history event comprises one or more of identifying information relating to the user, dollar amounts and/or account balances relating to the credit event, credit card numbers, account numbers, address information, loan information, credit scores, or credit-related or personal information.

14. A non-transitory computer-readable storage medium comprising executable instructions that, in response to execution by one or more computer processors of a computer system, cause the computer system to perform operations comprising:
receiving a request for credit monitoring of a user via a credit monitoring service;
receiving identifying information relating to the user, the information submitted by the user in response to the user receiving a web page, for presentation, which requests identifying information sufficient to authorize reporting, to the user, of credit events related to credit data associated with the user as maintained and updated by one or more credit bureaus;
determining whether the identifying information relating to the user is sufficient to authorize reporting of credit events to the user;
 in response to determining that the identifying information is sufficient, identifying the user as having completed enrollment in the credit monitoring service; or
 in response to determining that the identifying information is not sufficient, identifying the user as not having completed enrollment in the credit monitoring service;
identifying, for transmission as an alert message to the user and by the computer system, a credit event in the user's credit, wherein a frequency of transmitting respective alert messages increases, or decreases, based on a sufficiency of the identifying information to authorize reporting of credit events to the user;
in response to identifying the credit event:
 determining whether the user has completed enrollment in the credit monitoring service; and
 in response to determining that the user has not completed enrollment in the credit monitoring service, transmitting to the user an alert message indicating that the credit event was identified, but not including detailed information regarding the credit event, the alert message further indicating a link to an internet-accessible user interface indicating additional information of the user that is required before providing the detailed information regarding the credit event;
 when the user provides the additional information, providing the detailed information regarding the credit event to the user.

15. The non-transitory computer-readable storage medium of claim 14 in combination with a computer system comprising one or more computer processors.

16. The non-transitory computer-readable storage medium of claim 14, wherein identifying a credit event comprises retrieving credit data of the user from a credit bureau, identifying a change in the retrieved credit data, and determining if the change should be reported to the user, based at least in part upon one or more credit event significance factors.

17. The non-transitory computer-readable storage medium of claim 14, wherein receiving a request for credit monitoring of a user comprises receiving third-party data relating to the user without directly communicating with the user.

18. The non-transitory computer-readable storage medium of claim 14, wherein receiving a request for credit monitoring of a user comprises receiving user information from a computer of the user.

19. The non-transitory computer-readable storage medium of claim 14, wherein in response to determining that a user has completed enrollment in the credit monitoring service, transmitting an alert message comprising detailed information regarding the credit event.

20. The non-transitory computer-readable storage medium of claim 14, wherein the detailed information regarding the credit event comprises one or more of identifying information relating to the user, dollar amounts and/or account balances relating to the credit event, credit card numbers, account numbers, address information, loan information, credit scores, or credit-related or personal information.

21. A system comprising:
a first system in communication with a user computing device associated with a consumer, the first system comprising one or more processors and a non-transitory computer-readable storage medium storing executable instructions that, in response to execution by the one or more processors, cause the first system to perform operations comprising:
 receiving, from the user computing device associated with the consumer, a request to enroll in a credit monitoring service, wherein the request includes personally identifying information for the consumer, the information submitted by the consumer in response to the consumer receiving a web page, for presentation, which requests identifying information sufficient to authorize reporting, to the consumer, credit history events for the consumer;
 authenticating the identity of the consumer based on the personally identifying information;
 determining whether the personally identifying information is sufficient to authorize reporting of credit history events for the consumer; and
 in response to determining that the personally identifying information is not sufficient to authorize reporting of credit history events for the consumer, enrolling the consumer in a first type of credit monitoring service, wherein the first type of credit monitoring service provides the consumer with basic information related to events in the consumer's credit history, or
 in response to determining that the personally identifying information is sufficient to authorize reporting of credit history events for the consumer, enrolling the consumer in a second type of credit monitoring service, wherein the second type of credit monitoring service provides the consumer with basic information and detailed information related to events in the consumer's credit history;
 identifying, for transmission as an alert message to the user computing device, an event in the consumer's credit history based on a periodic monitoring of the consumer's credit history accessed from a credit bureau, wherein more, or less, unique events are identified for transmission based on a sufficiency of the personally identifying information to authorize reporting of the credit history events to the consumer;

in response to identifying the event in the consumer's credit history, generating an alert message related to the identified event to send to the consumer, wherein generating the alert message comprises:

determining the type of credit monitoring service in which the consumer is enrolled;

in response to determining that the consumer is enrolled in the first type of credit monitoring service:

generating the alert message, wherein the alert message includes basic information relating to the identified event in the consumer's credit history; and providing an option for the consumer to enroll in the second type of credit monitoring service in order to access detailed information related to the identified event; or in response to determining that the consumer is enrolled in the second type of credit monitoring service, generating the alert message, wherein the alert message includes the basic information relating to the identified event and the detailed information relating to the identified event; and transmitting the alert message to the user computing device, wherein the alert message activates an application on the user computing device to cause the alert message to display; and the user computing device comprising one or more processors and a non-transitory computer-readable storage medium storing executable code, that when executed by the one or more processors, cause the user computing device to perform operations comprising:

in response to receiving user input of the consumer, providing, to the first system, the request to enroll in the credit monitoring service, the request including personally identifying information;

receiving, from the first system, the alert message related to the identified event.

22. A method comprising:

maintaining one or more authorization rules configured to determine whether consumers have completed enrollment in a credit monitoring service by providing respective sets of personally identifying information sufficient to authorize reporting of credit history;

obtaining, by a computer system comprising a processor, information identifying a consumer that interacted with a web page associated with a merchant or commercial entity, the information comprising at least a subset of the personally identifying information sufficient to authorize reporting of credit events of the consumer;

obtaining, from the consumer, an indication of a significant credit event selected from a plurality of credit events including new credit line inquiry, change of address, account reported for collection, and payment towards an account;

identifying, using the obtained information, one of the plurality of credit events in the consumer's credit data based on periodic monitoring of the consumer's credit data accessed from a credit bureau;

determining whether the credit event is the significant credit event identified by the user; and in response to determining that the identified credit event is the significant credit event, transmitting an alert message to the consumer comprising detailed information relating to the identified credit event, or in response to determining that the identified credit event is not the significant credit event, transmitting an alert message to the consumer comprising only a portion of detailed information relating to the identified credit event, wherein the alert message activates an application on a user computing device of the consumer to cause the alert message to display the alert message including a link to an internet-accessible page including detailed information regarding the identified credit event.

23. The method of claim 22, wherein the authorization rules are customizable by an administrator of the computer system.

24. The method of claim 22, wherein the alert message further includes a reference to activate, for display, an email system accessible through a web page associated with the merchant or commercial entity.

\* \* \* \* \*